US009207929B2

(12) United States Patent
Katsura

(10) Patent No.: US 9,207,929 B2
(45) Date of Patent: Dec. 8, 2015

(54) INTEGRATED SYSTEM AND FIRMWARE UPDATE METHOD

(71) Applicant: Hitachi, Ltd., Tokyo (JP)

(72) Inventor: Naohiro Katsura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/368,097

(22) PCT Filed: Aug. 26, 2013

(86) PCT No.: PCT/JP2013/072713
§ 371 (c)(1),
(2) Date: Jun. 23, 2014

(87) PCT Pub. No.: WO2015/029104
PCT Pub. Date: Mar. 5, 2015

(65) Prior Publication Data
US 2015/0169313 A1    Jun. 18, 2015

(51) Int. Cl.
*G06F 9/44* (2006.01)
*G06F 9/445* (2006.01)
(Continued)

(52) U.S. Cl.
CPC ...... *G06F 8/65* (2013.01); *G06F 11/00* (2013.01); *G06F 8/61* (2013.01); *G06F 8/71* (2013.01); *G06F 11/1433* (2013.01)

(58) Field of Classification Search
CPC ............... G06F 8/65; G06F 8/61; G06F 8/71; G06F 11/1433
See application file for complete search history.

(56) References Cited

U.S. PATENT DOCUMENTS 8,321,863 B2 * 11/2012 Yamaguchi ......... G06F 9/45558
717/170
2003/0035124 A1    2/2003 Tomita et al.
2006/0015861 A1    1/2006 Takata et al.
(Continued)

FOREIGN PATENT DOCUMENTS

JP    2003-054087 A    2/2003
JP    2006-031312 A    2/2006
(Continued)

OTHER PUBLICATIONS

Luciano Antonio Mendes et al., Systematization of the WebLabs Development Process: Towards and Approach Proposal, ICEE, 2010, retrieved online on 201509-17, pp. 1-9. Retrieved from the Internet: <URL: http://ineerweb.osanet.cz/Events/ICEE2010/papers/W13E/Paper_1052_1139.pdf>.*

*Primary Examiner* — Thuy Dao
*Assistant Examiner* — Hanh T Bui
(74) *Attorney, Agent, or Firm* — Volpe and Koenig, P.C.

(57) ABSTRACT

Proposed are an integrated system and a firmware update method capable of facilitating the update of firmware and alleviating the burden of the administrator. In an integrated system comprising a computer, a storage device, a connecting device and a management computer, the management computer stores in a memory and manages, as a firmware version of the integrated system, information indicating a combination of operation-guaranteed firmware versions regarding firmware versions of each of the devices of the computer, the storage device and the connecting device, and, upon updating firmware of each of the devices of the computer, the storage device and the connecting device, collectively updates the firmware of each of the devices of the computer, the storage device and the connecting device based on the firmware version of the integrated system.

9 Claims, 14 Drawing Sheets

(51) Int. Cl.
*G06F 11/00* (2006.01)
*G06F 11/14* (2006.01)

(56) References Cited

U.S. PATENT DOCUMENTS

| | | |
|---|---|---|
| 2007/0165659 A1 | 7/2007 | Yasuda et al. |
| 2007/0226729 A1 | 9/2007 | Ueda et al. |
| 2012/0023233 A1* | 1/2012 | Okamoto ............... G06F 9/4856 709/226 |
| 2013/0246668 A1 | 9/2013 | Kaneda et al. |
| 2014/0019972 A1* | 1/2014 | Yahalom ............. H04L 67/1097 718/1 |
| 2015/0169313 A1* | 6/2015 | Katsura .................... G06F 8/65 717/170 |

FOREIGN PATENT DOCUMENTS

| | | |
|---|---|---|
| JP | 2007-188374 A | 7/2007 |
| JP | 2007-264697 A | 10/2007 |
| WO | 2011/158300 A1 | 12/2011 |

* cited by examiner

Fig.3

INTRA-SYSTEM CONFIGURATION INFORMATION RETENTION TABLE 204312

| SYSTEM NUMBER | SYSTEM CONFIGURATION | | | |
|---|---|---|---|---|
| | TYPE | MODEL | QUANTITY INSTALLED | 2043122 |
| 100 | CONNECTING DEVICE | 1000 | 1 | |
| | COMPUTER | 2000 | 1 | |
| | | 2000' | 1 | |
| | STORAGE DEVICE | 3000 | 1 | |
| | MANAGEMENT COMPUTER | 4000 | 1 | |
| | TOPOLOGY INFORMATION | INTEGRATED SYSTEM <100> — CONNECTING DEVICE <1000> — COMPUTER <2000> — COMPUTER <2000'> — STORAGE DEVICE<3000> — MANAGEMENT COMPUTER<4000> | | 2043123 |

INTER-SYSTEM CONFIGURATION INFORMATION RETENTION TABLE 204313

| HIGHER-LEVEL CONNECTING DEVICE NUMBER | SYSTEM NUMBER | CONNECTING DEVICE MODEL | CONNECTED DEVICE QUANTITY | TOPOLOGY INFORMATION |
|---|---|---|---|---|
| 200 | 100 | 1000 | 2 | HIGHER-LEVEL CONNECTING DEVICE <200><br>CONNECTING DEVICE <1000><br>INTEGRATED SYSTEM <100> |
| | 100' | 1000' | 2 | HIGHER-LEVEL CONNECTING DEVICE <200><br>CONNECTING DEVICE <1000'><br>INTEGRATED SYSTEM <100'> |
| 2043131 | 2043132 | 2043133 | 2043134 | 2043135 |

Fig.5

CONNECTING PATH INFORMATION RETENTION TABLE 204314

| SYSTEM NUMBER | VIRTUAL COMPUTER NUMBER | COMPUTER NUMBER | STORAGE AREA NUMBER | STORAGE DEVICE NUMBER | TOPOLOGY INFORMATION |
|---|---|---|---|---|---|
| 100 | 2001 | 2000 | 3001 | 3000 | INTEGRATED SYSTEM <100><br>CONNECTING DEVICE <1000><br>VIRTUAL COMPUTER <2001><br>VIRTUAL COMPUTER <2002><br>VIRTUAL COMPUTER <2003><br>COMPUTER <2000><br>COMPUTER <2000'><br>STORAGE AREA <3001><br>STORAGE AREA <3002><br>STORAGE DEVICE <3000><br>MANAGEMENT COMPUTER <4000> |
| | 2002 | 2000' | 3001 | 3000 | |
| | 2003 | 2000' | 3002 | 3000 | |

UTILIZATION RATE INFORMATION RETENTION TABLE 204315

| DATA PROCESSING NUMBER | PROCESS NUMBER | VIRTUAL COMPUTER/ STORAGE AREA | MEASURED ITEM | TIME SERIES INFORMATION | | |
|---|---|---|---|---|---|---|
| | | | | 2013.6.15 10:00 | 2013.6.15 9:59 | 2013.6.15 9:58 |
| 5000 | 5001 | VIRTUAL COMPUTER 2001 | CPU LOAD FACTOR [%] | 62% | 60% | 90% |
| | | STORAGE AREA 3001 | AVAILABLE CAPACITY | 805GB | 802GB | 800GB |
| 5100 | 5101 | VIRTUAL COMPUTER 2002 | CPU LOAD FACTOR [%] | 48% | 45% | 90% |
| | | STORAGE AREA 3001 | AVAILABLE CAPACITY | 202GB | 201GB | 200GB |
| 5200 | 5201 | VIRTUAL COMPUTER 2003 | CPU LOAD FACTOR [%] | 48% | 45% | - |
| | | STORAGE AREA 3002 | AVAILABLE CAPACITY | 11GB | 10GB | - |
| 2043151 | 2043152 | 2043153 | 2043154 | | 2043155 | |

Fig.7

UPDATE PLAN INFORMATION RETENTION TABLE 204316

| | |
|---|---|
| DATA CENTER NUMBER | A |
| SAVING SOURCE SYSTEM NUMBER | 100 |
| SAVING SOURCE VIRTUAL COMPUTER NUMBER | 2001,2002,2003 |
| SAVING SOURCE STORAGE AREA NUMBER | 3001,3002 |
| SAVING DESTINATION SYSTEM NUMBER | 100' |
| TOPOLOGY INFORMATION | HIGHER-LEVEL CONNECTING DEVICE <200><br><br>CONNECTING DEVICE <1000>  CONNECTING DEVICE <1000'><br><br>INTEGRATED SYSTEM <100>  INTEGRATED SYSTEM <100'> |

2043161 — DATA CENTER NUMBER
2043162 — SAVING SOURCE VIRTUAL COMPUTER NUMBER
2043163 — SAVING DESTINATION SYSTEM NUMBER
2043164 — TOPOLOGY INFORMATION

Fig.8

FIRMWARE VERSION INFORMATION RETENTION TABLE 204317

| | | | |
|---|---|---|---|
| 2043171 — INTEGRATED SYSTEM FIRMWARE VERSION | | 1.3 | 1.4 |
| 2043172 — DEVICE-BASED FIRMWARE VERSION | COMPUTER | 6 | 7 |
| | STORAGE DEVICE | 5 | 6 |
| | CONNECTING DEVICE | 3 | 4 |

Fig.9

FIRMWARE UPDATE INFORMATION RETENTION TABLE 204318

| | | | |
|---|---|---|---|
| 2043181 — INTEGRATED SYSTEM FIRMWARE VERSION | | Ver1.3->Ver1.4 | UPDATING |
| 2043182 — FIRMWARE UPDATE START TIME | | 2013/XX/YY | |
| FIRMWARE UPDATE END TIME | | 2013/XX/YY | |
| 2043183 — DEVICE-BASED FIRMWARE UPDATE STATUS | COMPUTER | Ver6 -> Ver7 | NORMAL END |
| | STORAGE DEVICE | Ver5 -> Ver6 | NORMAL END |
| | CONNECTING DEVICE | Ver3 | NOT YET UPDATED |
| 2043184 — LOCATION OF FAILURE | | NONE | |

Fig.16

CLOUD MANAGEMENT INFORMATION RETENTION TABLE 204319

| # | SAVING DESTINATION CANDIDATE (CLOUD PLATFORM) | VIRTUAL COMPUTER CPU LOAD FACTOR [%] | STORAGE AREA AVAILABLE CAPACITY |
|---|---|---|---|
| 1 | XXX | 45% | 500TB |
| 2 | YYY | 70% | 200TB |

2043191  2043192  2043193  2043194

INTEGRATED SYSTEM AND FIRMWARE UPDATE METHOD

TECHNICAL FIELD

The present invention relates to an integrated system and a firmware update method.

BACKGROUND ART

In recent years, the development of integrated systems is advancing. An integrated system is a system that is configured from a computer, a storage device and a connecting device, and is a system that is provided to the installation destination in a state where the computer, the storage device and the connecting device are assembled in advance. An integrated system is provided after a vendor assembles the computer, the storage device and the connecting device in advance and conducts various operation tests. Consequently, an integrated system can be used at the installation destination without any trouble.

It could be said that an integrated system is a system in which its operation is guaranteed since the system is installed after various operation tests are conducted by the vendor as described above. As a result of installing an integrated system, it is possible to speed up the process from installation to operation, optimize the operational efficiency, and alleviate the burden of the administrator. Moreover, it is also easy to enhance the overall system by sequentially adding a plurality of integrated systems, and the configuration of the overall system can be set to be a configuration that is suitable for the user.

Meanwhile, with an integrated system, a plurality of devices such as a computer, a storage device and a connecting device are treated as a single unit. Thus, upon renewing the integrated system, there are many issues to be considered; for instance, what kind of device configuration should be adopted upon renewing the integrated system, how to respectively arrange the programs, data and virtual computers in the case of connecting a plurality of integrated systems side by side, and how to establish the connectivity of integrated systems of different types or generations. Thus, there is a problem in that the burden of the administrator increases during the foregoing renewal of the integrated system.

PTL 1 discloses a technology of, upon renewing an integrated system, referring to life information of each integrated system and selecting an integrated system to be removed, referring to intra-device configuration information of each integrated system, and intra-device configuration information and connectivity guarantee information of integrated systems scheduled to be installed and selecting an integrated system to be installed, and outputting information related to the selected integrated system to be removed and the selected integrated system to be installed. According to PTL 1, it is possible to automatically select the integrated system to be additionally installed, and thereby alleviate the burden of the administrator.

CITATION LIST

Patent Literature

[PTL 1] International Publication No. 2011/158300

SUMMARY OF INVENTION

Technical Problem

Nevertheless, while PTL 1 describes the replacement of integrated systems; that is, the renewal of hardware, PTL 1 does not provide any description regarding the renewal of firmware. In an integrated system, a computer, a storage device and a connecting device are respectively operating as described above, and the firmware of each of the devices of the computer, the storage device and the connecting device needs to be appropriately updated in order to continue using such hardware.

Upon updating the firmware, in light of the characteristics of an integrated system, the firmware of each of the devices needs to be updated while maintaining a state in which the operation thereof is guaranteed, and consideration must be given to the relation of the respective devices. For example, when the version of the firmware of each of the devices of the computer, the storage device and the connecting device is simply upgraded to the latest version, cases may be considered where the integrated system will not operate appropriately because, for instance, the computer does not support the version of the storage device. In the foregoing case, the burden of the administrator will increase because it is necessary to change the firmware version for each device and perform operation tests on all such occasions so that each device operates appropriately.

Particularly, in a large-scale system that is configured from a plurality of integrated systems, the types and generations differ among the respective integrated systems. Thus, the burden of the administrator will increase because, for each of the integrated systems, it is necessary to verify that each device after the firmware update operates appropriately and guarantee the operation of the integrated system.

The present invention was devised in view of the foregoing points, and an object of this invention is to propose an integrated system and a firmware update method capable of facilitating the update of firmware and alleviating the burden of the administrator

Solution to Problem

In order to achieve the foregoing object, the present invention provides an integrated system comprising a computer, a storage device, a connecting device and a management computer, wherein the management computer stores in a memory and manages, as a firmware version of the integrated system, information indicating a combination of operation-guaranteed firmware versions regarding firmware versions of each of the devices of the computer, the storage device and the connecting device, and, upon updating firmware of each of the devices of the computer, the storage device and the connecting device, collectively updates the firmware of each of the devices of the computer, the storage device and the connecting device based on the firmware version of the integrated system.

Moreover, in order to achieve the foregoing object, the present invention additionally provides a firmware update method of an integrated system comprising a computer, a storage device, a connecting device and a management computer, wherein the management computer comprises a first step of storing in a memory and managing, as a firmware version of the integrated system, information indicating a combination of operation-guaranteed firmware versions regarding firmware versions of each of the devices of the computer, the storage device and the connecting device, and a second step of collectively updating, upon updating firmware of each of the devices of the computer, the storage device and the connecting device, the firmware of each of the devices of the computer, the storage device and the connecting device based on the firmware version of the integrated system.

Advantageous Effects of Invention

According to the present invention, it is possible to facilitate the update of firmware and alleviate the burden of the administrator.

BRIEF DESCRIPTION OF DRAWINGS

FIG. 3 is a logical configuration diagram of the intra-system configuration information retention table.

FIG. 4 is a logical configuration diagram of the inter-system configuration information retention table.

FIG. 5 is a logical configuration diagram of the connecting path information retention table.

FIG. 6 is a logical configuration diagram of the utilization rate information retention table.

FIG. 7 is a logical configuration diagram of the update plan information retention table.

FIG. 8 is a logical configuration diagram of the firmware version information retention table.

FIG. 9 is a logical configuration diagram of the firmware update information retention table.

FIG. 16 is a logical configuration diagram of the cloud management information retention table.

DESCRIPTION OF EMBODIMENTS

An embodiment of the present invention is now explained in detail with reference to the drawings.

(1) First Embodiment (1-1) Overall Configuration

Figure 1:
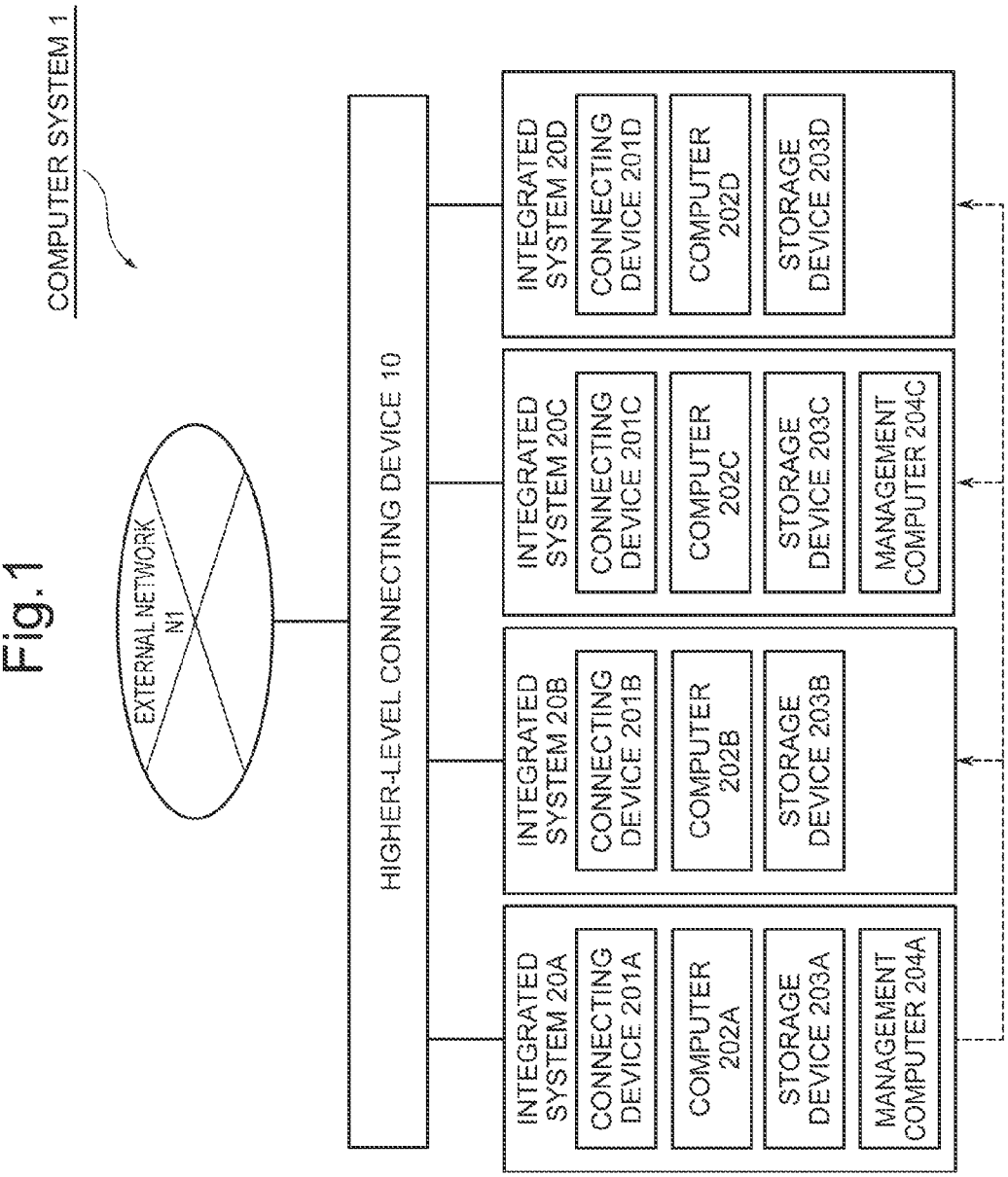
FIG. 1 is an overall configuration diagram of the computer system in the present embodiment.

FIG. 1 shows an overall configuration of a computer system 1 in the present embodiment. The computer system 1 is configured from a higher-level connecting device 10, a plurality of integrated systems 20A to 20D, and an external network N1. The external network N1 is, for example, a LAN (Local Area Network) or a WAN (Wide Area Network), and is connected to the higher-level connecting device 10. The higher-level connecting device 10 is connected to the external network N1 and the plurality of integrated systems 20A to 20D.

Note that, in the ensuing explanation, when there is no need to specifically differentiate the integrated systems 20A to 20D, they will be collectively indicated and explained as the "integrated system 20". Similarly, when there is no need to specifically differentiate the connecting devices 201A to 201D, the computers 202A to 202D, the storage devices 203A to 203D, and the management computers 204A and 204C, they will be collectively indicated and explained as the "connecting device 201", the "computer 202", the "storage device 203", and the "management computer 204", respectively.

The plurality of integrated systems 20 can access each other via the higher-level connecting device 10 by being respectively connected to the higher-level connecting device 10. Moreover, the plurality of integrated systems 20 can access another data center (not shown), which is connected to the external network N1, via the higher-level connecting device 10 and the external network N1.

The plurality of integrated systems 20 may all be installed in the computer system 1 from the beginning, or, for example, it is also possible to install only the integrated system 20A in the computer system 1 at the beginning, and subsequently add the integrated systems 20B to 20D. As described above, it is easy to enhance the computer system 1 by sequentially adding the integrated system 20, and the configuration of the computer system 1 can be set to be a configuration that is suitable for the user.

The plurality of integrated systems 20A to 20D all have the same basic configuration. In other words, all of the integrated systems 20A to 20D are configured by comprising a connecting device 201, a computer 202 and a storage device 203. However, here, the integrated systems 20A and 20C differ from the integrated systems 20B and 20D with respect to the point of comprising management computers 204A and 204C.

Moreover, the management computer 204A is set as a master, and differs from the management computer 204C with respect to the point of collecting various types of information from the integrated systems 20A to 20D, and controlling the integrated systems 20A to 20D based on the various types of information that were collected. In the ensuing explanation, the integrated system 20A is taken as an example and explained.

The integrated system 20A is configured by comprising a connecting device 201A, a computer 202A, a storage device 203A and a management computer 204A. The connecting device 201A, the computer 202A, the storage device 203A and the management computer 204A are provided to the installation destination after a vendor assembles these devices in advance and performs various operation tests. Consequently, the connecting device 201A, the computer 202A, the storage device 203A and the management computer 204A can be used without any trouble at the installation destination (computer system 1 in this example).

The connecting device 201A is a communication device that communicably connects the computer 202A, the storage device 203A and the management computer 204A with each other, and communicably connects these devices with the higher-level connecting device 10. The computer 202A is a computer that executes processing according to the users business operations based on the loaded application software. The computer 202A provides a virtual computer to the user.

The storage device 203A is a memory that stores data to be read and written by the computer 202A and programs to be executed by the computer 202A. The storage device 203A provides a storage area to the computer 202A. Note that, in addition to providing a storage area to the computer 202A, there are also cases where the storage device 203A provides a storage area to another computer (for example, computer 202B).

The management computer 204A is a computer that collects various types of information from the integrated systems 20A to 20D, and controls the operation of the integrated systems 20A to 20D based on the various types of information that were collected as described above. Moreover, the management computer 204A may access another data center (not shown) connected to the external network N1 and collect various types of information as needed. The various types of information to be collected by the management computer 204A will be described later (FIG. 2).

(1-2) Internal Configuration

Figure 2:
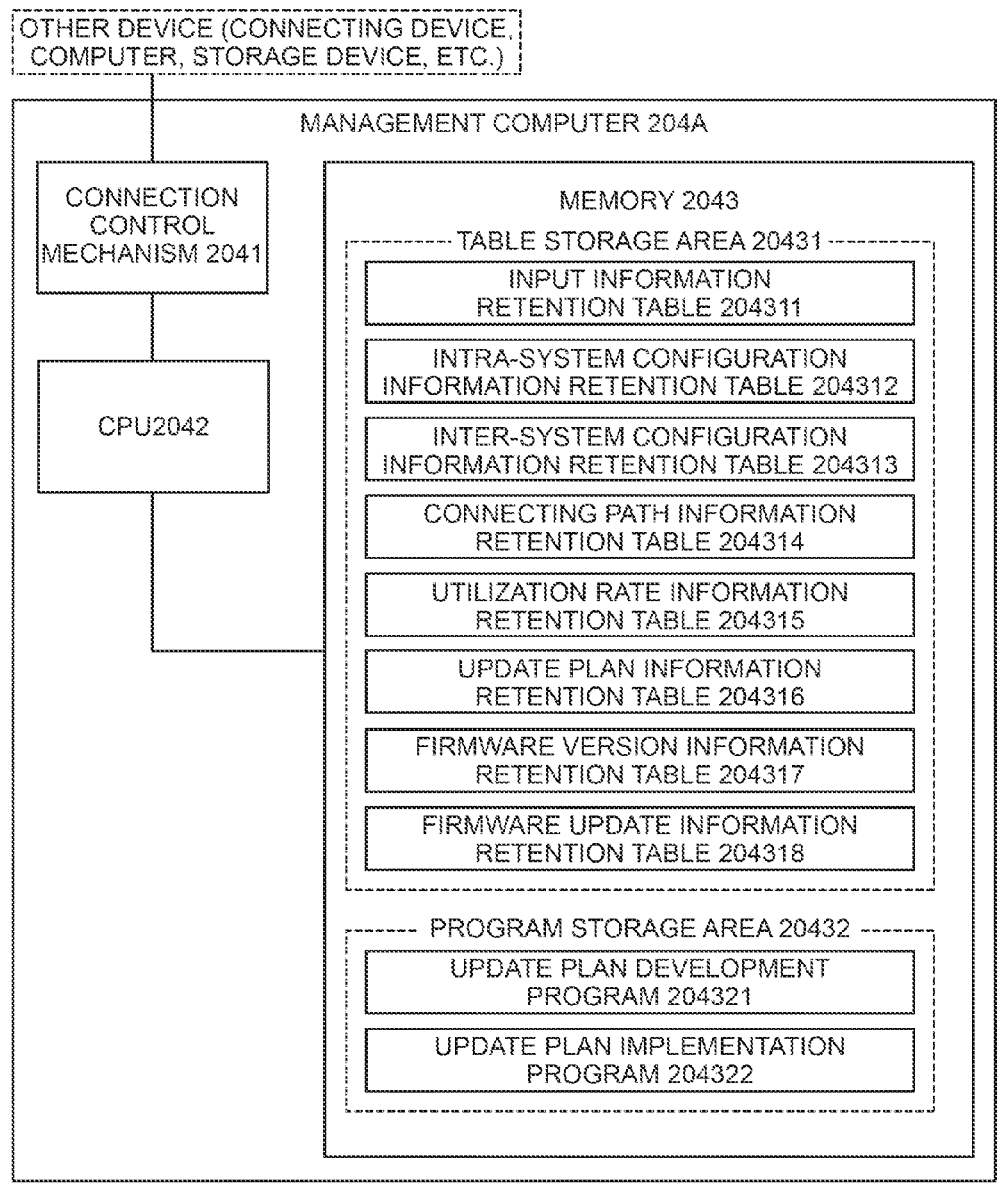
FIG. 2 is an internal configuration diagram of the management computer installed in the integrated system.

FIG. 2 shows an internal configuration of the management computer 204A. The management computer 204A is configured by comprising a connection control mechanism 2041, a CPU (Central Processing Unit) 2042 and a memory 2043. The connection control mechanism 2041 is a controller using the Ethernet (registered trademark) or InfiniBand, and is a device for transmitting control signals from the CPU 2042 to other devices (connecting device, computer, storage device) at a high speed. The CPU 2042 is a processor that governs the control of the operation of the management computer 204A in coordination with the various tables and various programs stored in the memory 2043.

The memory 2043 is configured from a table storage area 20431 and a program storage area 20432. The table storage area 20431 stores an input information retention table 204311, an intra-system configuration information retention table 204312, an inter-system configuration information retention table 204313, a connecting path information retention table 204314, a utilization rate information retention table 204315, an update plan information retention table 204316, a firmware version information retention table 204317 and a firmware update information retention table 204318. Details regarding these various tables will be described later (FIG. 3 to FIG. 9).

Note that the illustration of the input information retention table 204311 has been omitted since it merely includes the identification number for identifying the integrated systems 20A to 20D.

Moreover, the program storage area 20432 stores an update plan development program 204321 and an update plan execution program 204322. Details regarding the processing that is executed based on these various programs will be described later (FIG. 10 to FIG. 13).

(1-3) Table Configuration

FIG. 3 shows a logical configuration of the intra-system configuration information retention table 204312. The intra-system configuration information retention table 204312 is a table for managing the device configuration in the integrated system 20, and is configured from a system number column 2043121, a system configuration column 2043122 and a topology information column 2043123.

The system number column 2043121 stores the identification number for identifying the integrated system 20. The system configuration column 2043122 stores the type, model and quantity of the respective devices configuring the integrated system 20. Moreover, the topology information column 2043123 stores information indicating the topology of the respective devices configuring the integrated system 20.

Accordingly, the example of FIG. 3 shows a case where the identification number of the integrated system 20 is "100", and the integrated system 20 is configured from the respective devices of the following types; namely, "connecting device", "computer", "storage device" and "management computer". Moreover, for example, FIG. 3 shows that the model of the "connecting device" is "1000" and that the quantity installed is "1". FIG. 3 further shows that, as the topology, the connecting device, the computer, the storage device, and the management computer are arranged and connected in that order from upstream to downstream.

FIG. 4 shows a logical configuration of the inter-system configuration information retention table 204313. The inter-system configuration information retention table 204313 is a table for managing the connection relation of the integrated systems 20 connected to the higher-level connecting device 10, and is configured from a higher-level connecting device number column 2043131, a system number column 2043132, a connecting device model column 2043133, a connected device quantity column 2043134 and a topology information column 2043135.

The higher-level connecting device number column 2043131 stores the identification number for identifying the higher-level connecting device 10. The system number column 2043132 stores a number for identifying the integrated systems (for example, integrated systems 20A and 20B) that are connected to the higher-level connecting device 10. The connecting device model column 2043133 stores the model of the connecting devices (for example, connecting devices 201A and 201B) that are connected to the higher-level connecting device 10.

Moreover, the connected device quantity column 2043134 stores the number of connecting devices 201 that are connected to the higher-level connecting device 10. The topology information column 2043135 stores information indicating the topology of the integrated systems 20 (for example, integrated systems 20A and 20B) that are connected to the higher-level connecting device 10.

Accordingly, the example of FIG. 4 shows a case where the identification number of the integrated systems 20 connected to the higher-level connecting device 10, which has the higher-level connecting device number of "200", is "100" and "100'", and, because the connecting devices 201 of the connecting device model of "1000" and "1000'" are respectively connected to the higher-level connecting device 10, the connected device quantity is "2" devices. Moreover, FIG. 4 shows that, as the topology, the higher-level connecting device 10 is installed upstream and two integrated systems 20 are installed downstream, respectively, and the two integrated systems 20 are connected to the higher-level connecting device 10.

Note that, while FIG. 4 shows the inter-system configuration information retention table 204313 of a case where two integrated systems 20 are connected to the higher-level connecting device 10, when two more integrated systems 20 are to be added and four integrated systems 20A to 20D are connected to the higher-level connecting device 10 as with the computer system 1 shown in FIG. 1, the inter-system configuration information retention table 204313 is updated so that, for example, the connected device quantity becomes "4" devices.

FIG. 5 shows a logical configuration of the connecting path information retention table 204314. The connecting path information retention table 204314 is a table for managing the connection relation of the virtual computers provided by the computer 202 and the storage areas provided by the storage device 203, and is configured from a system number column 2043141, a virtual computer number column 2043142, a computer number column 2043143, a storage area number column 2043144, a storage device number column 2043145 and a topology information column 2043146.

The system number column 2043141 stores the identification number for identifying the integrated system 20. The virtual computer number column 2043142 stores the identification number of the virtual computer that was created in the integrated system 20. The computer number column 2043143 stores the identification number of the computer 202 that is providing the virtual computer.

Moreover, the storage area number column 2043144 stores the identification number of the storage area that is provided by the storage device 203. The storage device number column 2043145 stores the identification number for identifying the storage device 203. The topology information column 2043146 stores information indicating the topology of the computer 202, the virtual computers provided by the computer 202, the storage device 203 and the storage areas provided by the storage device 203.

Accordingly, the example of FIG. 5 shows a case where the integrated system 20 having a system number of "100" has three virtual computers respectively having identification numbers of "2001", "2002" and "2003" are created therein, and that the three virtual computers are being provided by two computers 202 respectively having identification numbers of "2000" and "2000". FIG. 5 further shows that the two storage areas respectively having identification numbers of "3001" and "3002" are being provided by the storage device 203 having an identification number of "3000".

FIG. 5 further shows that, as the topology, the virtual computers of "2001" and "2002" are connected to the storage area of "3001", and the virtual computer of "2003" is connected to the storage area of "3002".

FIG. 6 shows a logical configuration of the utilization rate information retention table 204315. The utilization rate information retention table 204315 is a table for managing the load factor of the CPU and the available capacity of the storage area assigned to the virtual computers for each data processing unit, and is configured from a data processing number column 2043151, a process number column 2043152, a virtual computer/storage area column 2043153, a measured item column 2043154 and a time series information column 2043155.

The data processing number column 2043151 stores the identification number for identifying the data processing. The process number column 2043152 stores the identification number of the process for executing the data processing. The virtual computer/storage area column 2043153 stores the identification number of the virtual computer and an identification number of the storage area. The measured item column 2043154 stores the measured item to be used as the index of the utilization rate. The time series information column 2043155 stores the utilization rate for each time series which is, in this case, in minutes.

Accordingly, the example of FIG. 6 shows a case where the data processing having a data processing number of "5000" is executed based on the processing having a process number of "5001", and that this process is a process to be executed in the virtual computer of "2001". FIG. 6 further shows that the load factor of the CPU assigned to the virtual computer of "2001" upon executing the data processing of "5000" is making the following transition; namely, "90%", "60%", "62%". FIG. 6 further shows that the availability capacity of the storage area of "3001" is making the following transition; namely, "800 GB", "802 GB", "805 GB".

FIG. 7 shows a logical configuration of the update plan information retention table 204316. The update plan information retention table 204316 is a table for managing a saving source and a saving destination in cases where it is necessary to save the virtual computers and storage areas included in the update-target vertical integration 20 to another integrated system 20 upon updating the firmware. The update plan information retention table 204316 is configured from a data center number column 2043161, a saving source column 2043162, a saving destination column 2043163 and a topology information column 2043164.

The data center number column 2043161 stores the identification number for identifying the data center. In this example, a data center refers to the integral range of the higher-level connecting device 10 and the integrated systems 20. The saving source column 2043162 stores the identification number of the integrated system 20 to become the saving source of the virtual computers and the storage areas upon updating the firmware, and the identification number of the virtual computers and the storage areas included in that integrated system 20.

Moreover, the saving destination column 2043163 stores the identification number of the integrated system 20 to become the saving destination of the virtual computers and the storage areas upon updating the firmware. The topology information column 2043164 stores information indicating the topology of the saving source integrated system 20 and the saving destination integrated system 20.

According, the example of FIG. 7 shows a plan where, upon updating the firmware of the integrated system 20 having an identification number of "100" in the data center having a data center number of "A", the virtual computers respectively having identification numbers of "2001", "2002" and "2003" and the storage areas respectively having identification numbers of "3001" and "3002" are to be save to the integrated system 20 having the identification number of "100". Moreover, FIG. 7 shows that, as the topology, the saving source integrated system 20 of "100" and the saving destination integrated system 20 of "100" are connected to the higher-level connecting device 10 of "200".

FIG. 8 shows a logical configuration of the firmware version information retention table 204317. The firmware version information retention table 204317 is a table for managing the firmware version of the overall integrated system 20, and the firmware versions of each of the devices of the connecting device 201, the computer 202 and the storage device 203 configuring the integrated system 20. The firmware version information retention table 204317 is configured from an integrated system firmware version column 2043171 and a device-based firmware version column 2043172.

The integrated system firmware version column 2043171 stores the firmware version of the overall integrated system 20. The device-based firmware version column 2043172 stores the firmware version of the respective devices configuring the integrated system 20. Note that the firmware version stored in the device-based firmware version column 2043172 is a combination of operation-guaranteed firmware versions.

Accordingly, the example of FIG. 8 shows a case where the firmware versions of the respective devices of the computer 202, the storage device 203 and the connecting device 201, which are associated when the firmware version of the integrated system 20 is "1.3", are "6", "5", and "3", respectively. FIG. 8 further shows that the firmware version of "1.3" of the integrated system 20 is a combination of the firmware versions of "6", "5", and "3" of the respective devices. Note that, when the firmware versions of the respective devices are combined with "6", "5", and "3", the operation of the integrated system 20 is guaranteed.

FIG. 9 shows a logical configuration of the firmware update information retention table 204318. The firmware update information retention table 204318 is a table for managing the update status of the firmware, and is configured from an integrated system firmware version column 2043181, a time column 2043182, a device-based firmware update status column 2043183 and a location of failure column 2043184.

The integrated system firmware version column 2043181 stores information relating to the update status of the firmware version of the integrated system 20. The time column 2043182 stores the time that the update of the firmware was started and the time that the update of the firmware was ended. The device-based firmware update status column 2043183 stores information relating to the update status of the firmware versions of the computer 202, the storage device 203 and the connecting device 201. The location of failure column 2043184 stores information relating to whether a failure occurred during the update of the firmware version or the location of failure in the event that a failure had occurred.

Accordingly, the example of FIG. 9 shows a plan where the firmware version of the integrated system 20 is to be updated from "Ver1.3" to "Ver1.4", and the current status is "Updating". FIG. 9 further shows that the update of the firmware version of the computer 202 from "Ver6" to "Ver7" ended normally based on the status of "Normal End". FIG. 9 further shows that the same applies to the storage device 203, and the update from "Ver5" to "Ver6" ended normally based on the status of "Normal End". With regard to the connecting device 201, FIG. 9 shows that the current version is "Ver3", and the current status is "Not Yet Updated".

Referring to FIG. 8, when the firmware version of the integrated system 20 is "1.4", the firmware version of the connecting device 201 will be subsequently updated from "3" to "4" since the firmware version of the connecting device 201 is "4".

(1-4) Flowchart

Figure 10:
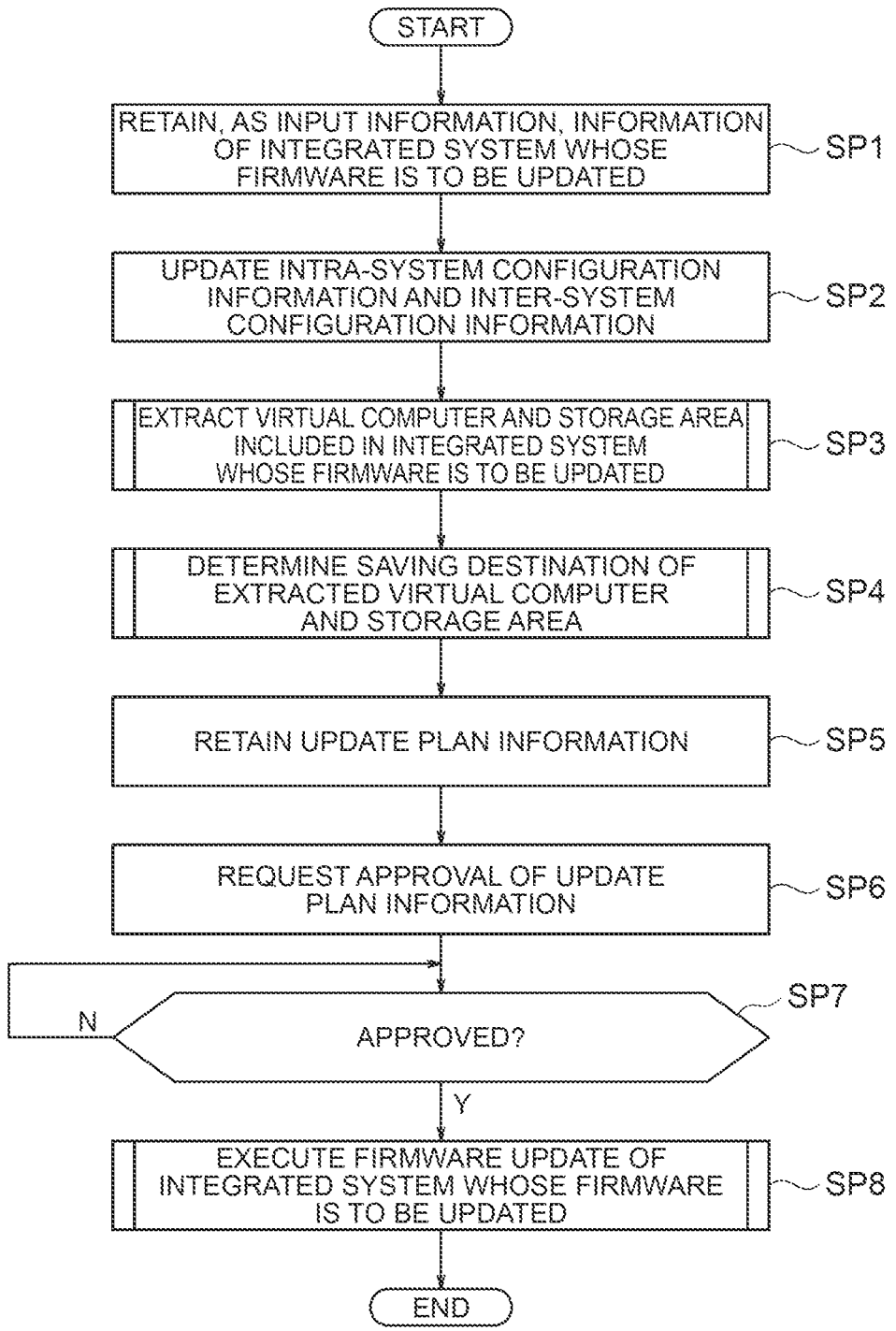
FIG. 10 is a flowchart showing the firmware update plan development processing.

FIG. 10 shows a processing routine of the firmware update plan development processing. The firmware update plan development processing is triggered by the administrator instructing the update of the firmware to the management computer 204, and executed based on the coordination of the CPU 2042 of the management computer 204, and the update plan development program 204321 and the update plan execution program 204322. For the sake of convenience in the ensuing explanation, the processing entity is explained as being the update plan development program 204321 or the update plan execution program 204322.

Foremost, when information of the integrated system 20 in which the firmware is to be updated is input based on the administrators operation, the update plan development program 204321 stores and retains the input information of the integrated system 20 in the input information retention table 204311 (SP1).

Subsequently, the update plan development program 204321 updates the intra-system configuration information and the inter-system configuration information stored in the intra-system configuration information retention table 204312 and the inter-system configuration information retention table 204313 to the latest information (SP2).

Note that the update plan development program 204321 is periodically monitoring and updating the intra-system configuration information and the inter-system configuration information, and, in step SP2, is updating the information to the latest information once again before the update of the firmware.

Subsequently, the update plan development program 204321 extracts the virtual computers and the storage areas included in the update-target integrated system 20 indicated based on the input information retained in step SP1 (SP3). The update plan development program 204321 thereafter determines the saving destination of the virtual computers and the storage areas extracted in step SP3 (SP4).

Subsequently, the update plan development program 204321 creates, as update plan information, information relating to the saving source and the saving destination of the virtual computers and the storage areas during the firmware update, and stores and retains the created information in the update plan information retention table 204316 (SP5).

Subsequently, the update plan development program 204321 presents the update plan information retained in step SP5 to the administrator and requests the administrator's approval (SP6), and determines whether the presented update plan information was approved (SP7). When the update plan development program 204321 obtains a negative result in the determination of step SP7, the update plan development program 204321 stands by until the approval is obtained. Note that, when the approval cannot be obtained, the update plan development program 204321 may also end the firmware update plan development processing.

Meanwhile, when the update plan development program 204321 obtains a positive result in the determination of step SP7, the update plan development program 204321 activates the update plan execution program 204322. The activated update plan execution program 204322 executes the update of the firmware of the update-target integrated system (SP8), and then ends the firmware update plan development processing.

Figure 11:
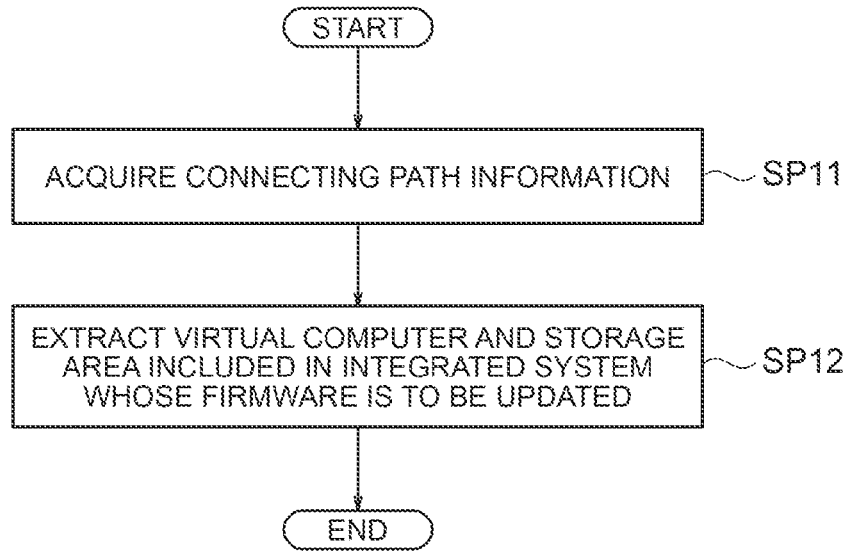
FIG. 11 is a flowchart showing the extraction processing.

FIG. 11 shows a processing routine of the extraction processing. The extraction processing is triggered by the and executed by the update plan development program 204321 firmware update plan development processing of FIG. 10 proceeding to step SP3, and update plan development program 204321.

Foremost, the update plan development program 204321 refers to the connecting path information retention table 204314 corresponding to the update-target integrated system 20, and acquires connecting path information (SP11). Subsequently, the update plan development program 204321 extracts the virtual computers and the storage areas included in the update-target integrated system 20 (SP12), and then ends the extraction processing.

Figure 12:
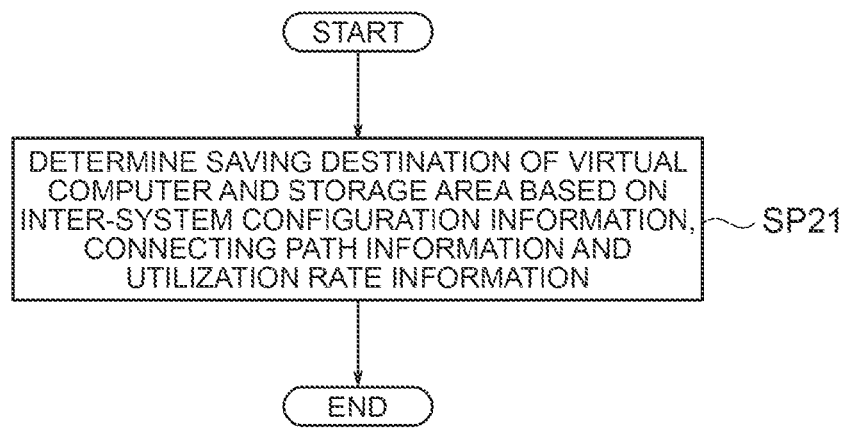
FIG. 12 is a flowchart showing the saving destination determination processing.

FIG. 12 shows a processing routine of the saving destination determination processing. The saving destination determination processing is triggered by the firmware update plan development processing of FIG. 10 proceeding to step SP4, and executed by the update plan development program 204321.

The update plan development program 204321 refers to the inter-system configuration information retention table 204313, the connecting path information retention table 204314 and the utilization rate information retention table 204315, determines the saving destination of the virtual computers and the storage areas extracted in step SP3 (or step SP12) based on the inter-system configuration information, the connecting path information and the utilization rate information which are stored in the foregoing tables (SP21), and then ends the saving destination determination processing.

Note that, to explain the processing of step SP21 in detail, foremost, the update plan development program 204321 refers to the inter-system configuration information retention table 204313, and acquires information (identification number) of other integrated systems 20 that are connected in a manner of being able to save the virtual computers and the storage areas. Subsequently, the update plan development program 204321 refers to the connecting path information retention table 204314, and acquires the information (identification number and connection relation) of the virtual computers and the storage areas included in the other integrated systems 20.

Subsequently, the update plan development program 204321 refers to the utilization rate information retention table 204315, and acquires the utilization rate of the virtual computers and the storage areas included in the other integrated systems 20. Note that the utilization rate is specifically the CPU load factor of the virtual computers and the available capacity of the storage areas.

Subsequently, the update plan development program 204321 determines as the saving destination, among the other integrated systems 20 that are connected in a manner of being able to save the virtual computers and the storage areas, an integrated system 20 which includes a storage area having an available capacity that is greater than the capacity of the storage area of the saving source, which includes a virtual computer having the lowest CPU load factor, and which can maintain the connection relation of the virtual computers and the storage areas.

Figure 13:
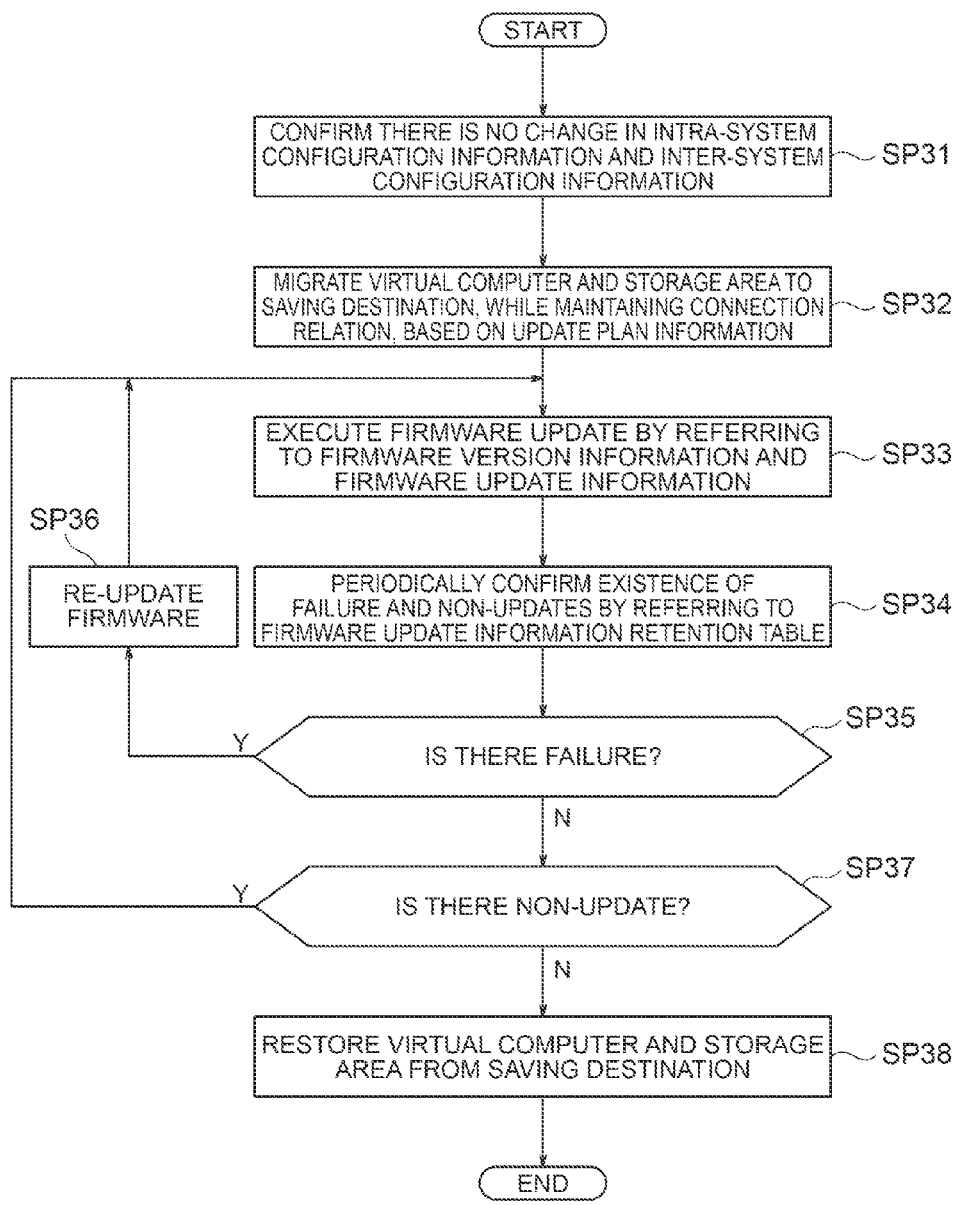
FIG. 13 is a flowchart showing the firmware update processing.

FIG. 13 shows a processing routine of the firmware update processing. The firmware update processing is triggered by the firmware update plan development processing of FIG. 10 proceeding to step SP8, and executed by the update plan execution program 204322.

Foremost, the update plan execution program 204322 refers to the update plan information retention table 204316, and additionally refers to the intra-system configuration information retention table 204312 and the inter-system configuration information retention table 204313, and confirms that there is no change in the intra-system configuration information and the inter-system configuration information (SP31).

Subsequently, the update plan execution program 204322 migrates the virtual computers and the storage areas from the saving source to the saving destination, while maintaining the connection relation of the virtual computers and the storage areas, based on the update plan information stored in the update plan information retention table 204316 (SP32).

Note that, in step SP32, the saving destination integrated system 20 migrates the virtual computers and the storage areas based a data copy program that is prepared in advance in the storage device 203. When the migration is complete, the saving destination integrated system 20 sends a completion notice indicating that the migration is complete to the saving source integrated system 20. The saving source integrated system 20 recognizes that the migration of the virtual computers and the storage areas is completed by receiving the completion notice that is sent from the saving destination.

Subsequently, when the migration of the virtual computers and the storage areas is complete, the update plan execution program 204322 refer to the firmware version information and the firmware update information stored in the firmware version information retention table 204317 and the firmware update information retention table 204318, and executes the update of firmware of the respective devices (SP33). While the updating order in this example is in the order of the computer 202, the storage device 203, and then the connecting device 201, the updating order is not necessarily limited thereto.

The update plan execution program 204322 periodically refers to the firmware update information retention table 204318 while the firmware of the respective devices is being sequentially updated in step SP33, and confirms whether a failure occurred in any of the devices and whether any of the devices have not yet been updated (SP34).

The update plan execution program 204322 determines whether the confirmation result of step SP34 indicates the occurrence of a failure (SP35). When the update plan execution program 204322 obtains a positive result in the determination of step SP35, the update plan execution program 204322 re-updates the firmware of the device (for example, storage device 203) in which a failure occurred (SP36). Otherwise, the update plan execution program 204322 may also return the firmware of all devices to the original state and send an error notice, and thereafter end the firmware update processing.

Meanwhile, when the update plan execution program 204322 obtains a negative result in the determination of step SP35, the update plan execution program 204322 determines whether the confirmation result in step SP34 indicates the existence of a device that has not yet been updated (SP37). When the update plan execution program 204322 obtains a positive result in the determination of step SP37, the update plan execution program 204322 proceeds to step SP33 and thereafter executes the update of firmware of the device (for example, connecting device 201) that has not yet been updated.

Meanwhile, when the update plan execution program 204322 obtains a negative result in the determination of step SP37, the update plan execution program 204322 determines that the firmware of all devices have been normally updated, returns the virtual computers and the storage areas, which were saved to the saving destination, from the saving destination to the saving source (SP38), and then ends the firmware update processing.

(1-5) Effect of First Embodiment

According to the integrated system of the first embodiment described above, since the combination of firmware versions of each of the devices of the operation-guaranteed computer, storage device and connecting device is managed as the firmware version of the integrated system, there is no need to individually update the firmware version of the respective devices included in the integrated system and verify the operation of the device each time firmware is updated. Consequently, it is possible to facilitate the update of the firmware version of the respective devices included in the integrated system and thereby alleviate the burden of the administrator.

(2) Second Embodiment

The second embodiment differs from the first embodiment with respect to the point that the saving destination of the virtual computers and the storage areas upon updating the firmware is a cloud or another data center, and not another integrated system. The integrated system and the firmware update method in the second embodiment are now explained. Note that the same configuration as the first embodiment is given the same reference numeral and the explanation thereof is omitted, and the different configurations are explained.

Meanwhile, in the first embodiment, upon updating the firmware of the integrated system, the processing of once saving the virtual computers and the storage area to another integrated system and returning the virtual computers and the storage areas to the saving source after the firmware update is complete is performed in order to enable the continued use of the virtual computers and the storage areas.

Nevertheless, when the firmware is updated in a state where the other integrated system does not have extra resources for saving the virtual computer and the storage area, there is a problem in that the use of the virtual computers and the storage areas must be stopped while the firmware is being updated, and the continued use of the virtual computers and the storage areas is not possible.

Thus, in the second embodiment, when there are no extra resources in the other integrated system for saving the virtual computers and the storage areas, the virtual computers and the storage areas are save to a cloud or another data center, and the firmware is updated while enabling the continued use of the virtual computers and the storage areas.

(2-1) Overall Configuration

Figure 14:
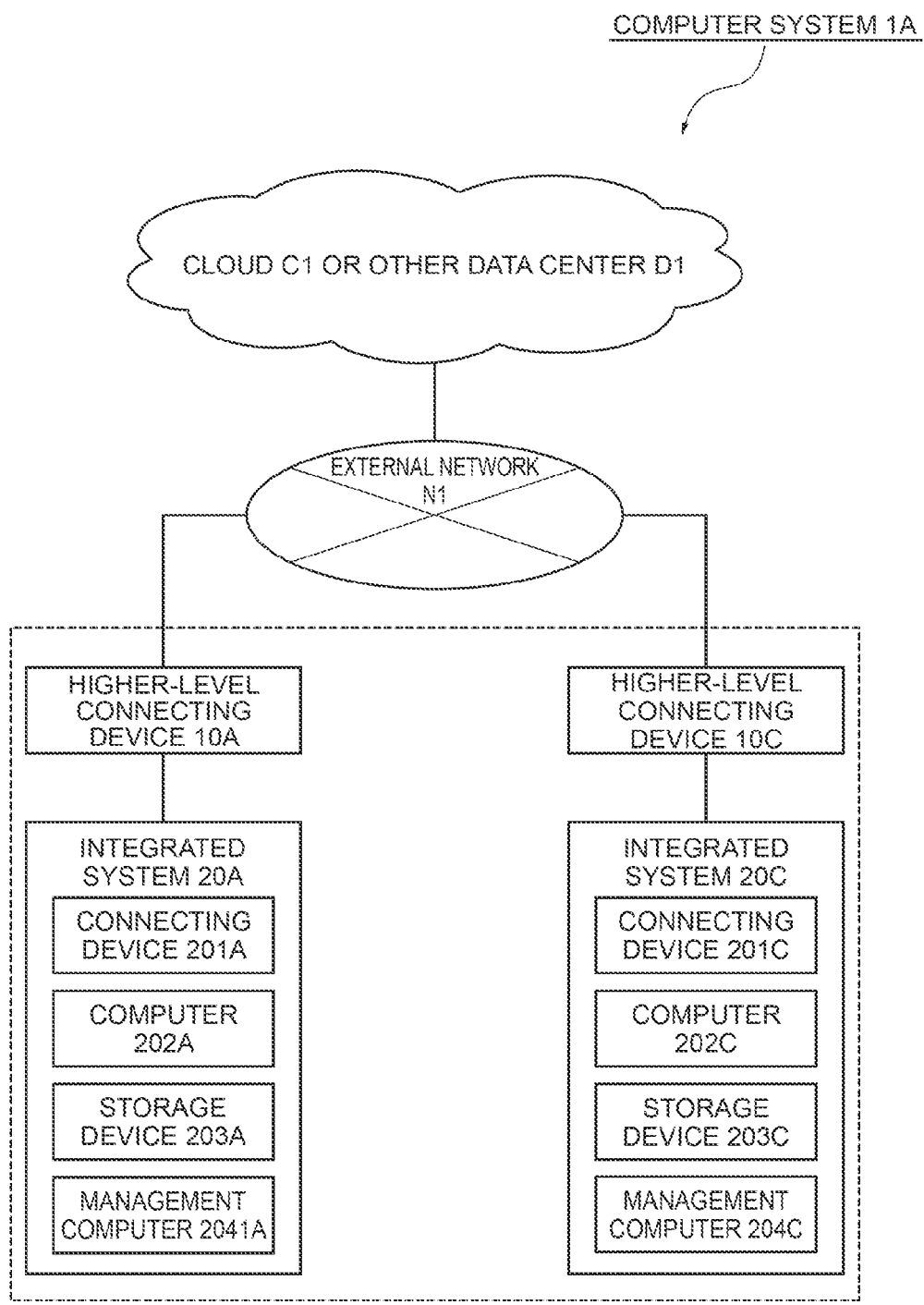
FIG. 14 is an overall configuration diagram of the computer system in the second embodiment.

FIG. 14 shows an overall configuration of a computer system 1A in the second embodiment. The computer system 1A differs from the computer system 1 in the first embodiment with respect to the point that individual higher-level connecting devices 10A and 10C are connected to the respective integrated systems 20A and 20C, and the point that a loud C1 or another data center D1 is connected to the external network N1.

In particular, as a result of the cloud C1 or the other data center D1 being connected to the external network N1, in the second embodiment, the virtual computers and the storage areas included in the integrated system 20A can be saved to the cloud C1 or the other data center D1 when they cannot be saved to the integrated system 200.

Note that, here, while only the integrated systems 20A and 20C are illustrated, the integrated systems 20A to 20D may be installed as with the first embodiment by sequentially adding the integrated systems 20B and 20D (FIG. 1) later.

(2-2) Internal Configuration

Figure 15:
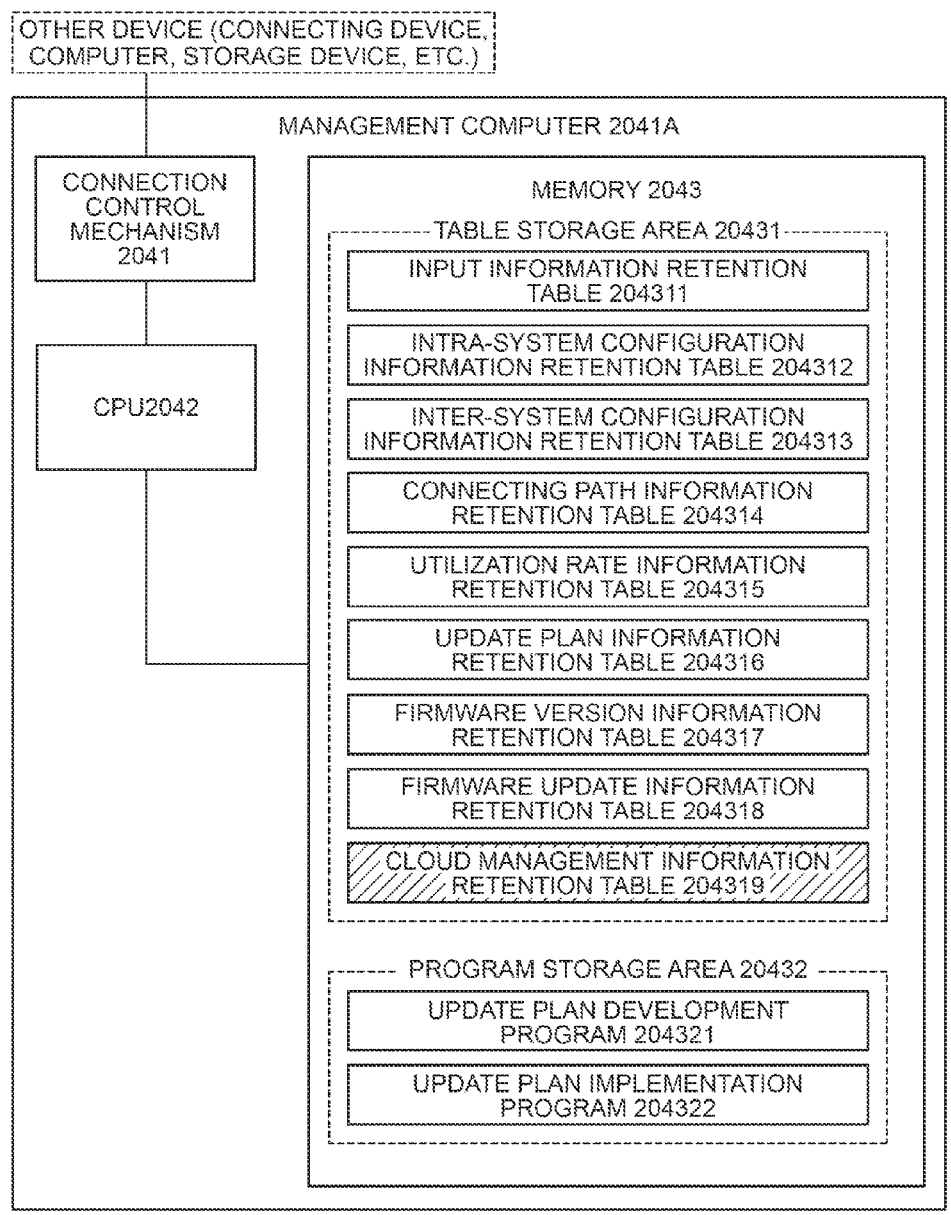
FIG. 15 is an internal configuration diagram of the management computer in the second embodiment.

FIG. 15 shows an internal configuration of the management computer 2041A. The management computer 2041A differs from the first embodiment with respect to the point that a cloud management information retention table 204319 is stored in the table storage area 20431 of the memory 2043.

(2-3) Table Configuration

FIG. 16 shows a logical configuration of the cloud management information retention table 204319. The cloud management information retention table 204319 is a table for managing the load factor of the CPU of the virtual computers and the available capacity of the storage areas provided in the cloud C1, and is configured from an identification number column 2043191, a saving destination candidate column 2043192, a CPU load factor column 2043193 and an available capacity column 2043194.

The identification number column 2043191 stores the identification number. The saving destination candidate column 2043192 stores the name of the platform that is provided in the cloud C1. The CPU load factor column 2043193 stores the load factor of the CPU of the virtual computers on the platform provided in the cloud C1. The available capacity column 2043194 stores the available capacity of the storage areas on the platform provided in the cloud C1.

Accordingly, the example of FIG. 16 shows a case where, with the platform having an identification number of "1" and a name of "XXX", the CPU load factor of the virtual computers is "45%", and the availability capacity of the storage areas is "500 TB".

Note that, here, while the cloud management information retention table 204319 stores the CPU load factor and the available capacity as the utilization rate of the platform, the utilization rate of the platform is not necessarily limited thereto, and, for example, time series information may also be stored as with the utilization rate information retention table 204315 of FIG. 6. Moreover, billing information may also be stored for each platform.

In particular, when billing information is stored for each platform, upon selecting the saving destination to save the virtual computers and the storage areas of the saving source (FIG. 12), it is possible to foremost determine the platform having a low utilization rate as the saving destination based on the CPU load factor and the available capacity, and, when platforms having roughly the same CPU load factor and available capacity are listed as a plurality of saving destination candidates, it is possible to subsequently determine the saving destination so that the platform with the lowest billing becomes the saving destination based on the billing information.

Moreover, additional service information (existence and contents of additional service) may also be stored for each platform. An additional service is, for example, a unique service such as a limited time coupon service that is provided for each platform. Here, with reference to the explanation based on the foregoing example, it is possible to foremost determine the platform having a low billing as the saving destination based on the billing information, and, when platforms having roughly the same billing are listed as a plurality of saving destination candidates, it is possible to subsequently determine the saving destination so that a platform with an additional service or a platform that is convenient for the administrator is determined as the saving destination based on the additional service information.

(2-4) Flowchart

The flowchart in the second embodiment differs from the first embodiment with respect to the point that, in the saving destination determination processing (FIG. 12), the saving destination is determined by referring to the cloud management information (FIG. 16), and not the utilization rate information (FIG. 6).

(2-5) Effect of Second Embodiment

According to the integrated system of the second embodiment described above, since a cloud or another data center can be used as the saving destination of the virtual computers and the storage areas during the firmware update, even in case where it is not possible to save the virtual computers and the storage areas to another integrated system because there is no extra resource, the firmware can be updated without having to discontinue the use of the virtual computers and the storage areas.

Moreover, upon selecting the saving destination for saving the virtual computers and the storage areas of the saving source, it is possible to refer to the cloud management information (FIG. 16) that is available from the cloud, and determine a platform that is optimal for the administrator among a plurality of platforms as the saving destination. In particular, when billing information or additional service information is included in the cloud management information, it is possible to refer to such information and determine a saving destination that is optimal for the administrator (for example, a saving destination with a low billing or a saving destination in which a coupon is available) rather than just simply determining a saving destination that is technically capable of saving the virtual computers and the storage areas of the saving source. It is thereby possible to also alleviate the economic burden of the administrator.

REFERENCE SIGNS LIST

1 Computer system
10 Higher-level connecting device
20 Integrated system
201 Connecting device
202 Computer
203 Storage device
204 Management computer

The invention claimed is:

1. An integrated system comprising a computer, a storage device, a connecting device and a management computer,
   wherein the management computer:
   stores in a memory and manages firmware version information for the integrated system, wherein the firmware version information for the integrated system indicates a combination of firmware versions that are guaranteed to be operable on all of the computer, the storage device and the connecting device; and
   upon updating firmware of each of the computer, the storage device and the connecting device, collectively updates the firmware of each of the computer, the storage device and the connecting device based on the firmware version information for the integrated system;
   wherein the integrated system is communicably connected to a cloud or another data center via a higher-level connecting device and an external network,
   wherein the management computer:
   stores in the memory and manages, as utilization rate information, a utilization rate of a virtual computer and a storage area included in a platform of the cloud or the other data center, and
   collectively updates the firmware of each of the computer, the storage device and the connecting device after saving either the virtual computer or the storage area included in the integrated system to one of the platforms of the cloud or one of the other data centers based on the utilization rate information.

2. The integrated system according to claim 1,
   wherein the management computer:
   stores in the memory and manages, as firmware update information, information indicating an update status of each of the devices while collectively updating the firmware of each of the devices of the computer, the storage device and the connecting device; and
   upon updating the firmware of each of the devices of the computer, the storage device and the connecting device, collectively updates the firmware while monitoring the update status of each of the devices of the computer, the storage device and the connecting device based on the firmware update information.

3. The integrated system according to claim 1,
   wherein the integrated system is communicably connected to another integrated system via a higher-level connecting device, and
   wherein the management computer:
   stores in the memory and manages, as utilization rate information, a utilization rate of a virtual computer and a storage area included in the other integrated system; and
   collectively updates the firmware of each of the devices of the computer, the storage device and the connecting device after saving either the virtual computer or the storage area included in the integrated system to the other integrated system based on the utilization rate information.

4. The integrated system according to claim 1,
   wherein the management computer:
   stores in the memory and manages, as cloud management information, billing information or additional service information in a case of using the platform of the cloud; and
   determines a saving destination of the virtual computer and the storage area included in the integrated system to be one of the platforms of the cloud based on the cloud management information.

5. A firmware update method of an integrated system comprising a computer, a storage device, a connecting device and a management computer,
   wherein the management computer comprises:
   a first step of storing in a memory and managing firmware version information for the integrated system, wherein the firmware version information for the integrated system indicates a combination of firmware versions that are guaranteed to be operable on all of the computer, the storage device and the connecting device; and
   a second step of collectively updating, upon updating firmware of each of the computer, the storage device and the connecting device, the firmware of each of the computer, the storage device and the connecting device based on the firmware version information for the integrated system;
   wherein the integrated system is communicably connected to a cloud or another data center via a higher-level connecting device and an external network,
   wherein the management computer comprises:
   a third step of storing in the memory and managing, as utilization rate information, a utilization rate of a virtual computer and a storage area included in a platform of the cloud or the other data center, and
   a fourth step of collectively updating the firmware of each of the computer, the storage device and the connecting device after saving either the virtual computer or the storage area included in the integrated system to one of the platforms of the cloud or one of the other data centers based on the utilization rate information.

6. The firmware update method according to claim 5,
   wherein the second step comprises:
   a third step of storing in the memory and managing, as firmware update information, information indicating an update status of each of the devices while collectively updating the firmware of each of the devices of the computer, the storage device and the connecting device; and
   a fourth step of collectively updating, upon updating the firmware of each of the devices of the computer, the storage device and the connecting device, the firmware while monitoring the update status of each of the devices of the computer, the storage device and the connecting device based on the firmware update information.

7. The firmware update method according to claim 5,
   wherein the integrated system is communicably connected to another integrated system via a higher-level connecting device, and
   wherein the management computer comprises:
   a third step of storing in the memory and managing, as utilization rate information, a utilization rate of a virtual computer and a storage area included in the other integrated system; and
   a fourth step of collectively updating the firmware of each of the devices of the computer, the storage device and the connecting device after saving either the virtual computer or the storage area included in the integrated system to the other integrated system based on the utilization rate information.

8. The firmware update method according to claim 5, wherein the management computer comprises:
a fifth step of storing in the memory and managing, as cloud management information, billing information or additional service information in a case of using the platform of the cloud, and
wherein the fourth step comprises:
a sixth step of determining a saving destination of the virtual computer and the storage area included in the integrated system to be one of the platforms of the cloud based on the cloud management information.

9. An integrated system comprising a computer, a storage device, a connecting device and a management computer,
wherein the integrated system is communicably connected to a cloud via a higher-level connecting device and an external network,
wherein the management computer:
stores in a memory and manages firmware version information for the integrated system, wherein the firmware version information for the integrated system indicates a combination of firmware that is guaranteed to be operable on all of the computer, the storage device and the connecting device;
stores in the memory and manages, as firmware update information, information indicating an update status of each of the devices while collectively updating the firmware of each of the devices of the computer, the storage device and the connecting device;
stores in the memory and manages, as utilization rate information, a utilization rate of a virtual computer and a storage area included in a platform of the cloud; and
upon updating the firmware of each of the computer, the storage device and the connecting device, collectively updates the firmware after saving either the virtual computer or the storage area included in the integrated system to one of the platforms of the cloud and while monitoring the update status of each of the computer, the storage device and the connecting device based on the firmware version information for the integrated system, the firmware update information and the utilization rate information.

\* \* \* \* \*